United States Patent Office 3,280,151
Patented Oct. 18, 1966

3,280,151
NOVEL PROCESS FOR PREPARATION OF
COLCHICINIC COMPOUNDS
Jacques Martel, Bondy, Seine, Edmond Toromanoff, Paris, and Chanh Huynah, Villemomble, Seine, France, assignors to Roussel-UCLAF, Paris, France, a corporation of France
No Drawing. Filed Mar. 31, 1964, Ser. No. 356,048
Claims priority, application France, Apr. 5, 1963, 930,600, Patent 1,363,961; June 7, 1963, 937,405, Patent 1,372,490
25 Claims. (Cl. 260—343.6)

The invention relates to a novel total synthesis for the preparation of 7 - desacetylamino - 11,12 - dihydro - colchiceine or 1,2,3-trimethoxy-9-hydroxy-10-oxo-5,6,7,10, 11,12-hexahydrobenzo-(a)-heptalene of the formula

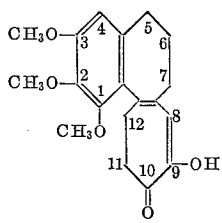

(I)

The above numbering system of the colchicine skeleton follows RRJ 3923 system of Ring Index, Second edition, 1960. The invention further relates to novel intermediates for 7 - desacetylamino - 11,12 - dihydro-colchiceine which is useful as an intermediate for desacetylamino-colchicine as described by Van Tamelen et al., Tetrahedron, 1961, vol. 14, p. 32. The desacetylamino-colchicine has a very remarkable antimitotic activity.

It is an object of the invention to provide a novel, economical total synthesis for 7-desacetylamino-11,12-dihydro-colchiceine.

It is another object of the invention to provide novel intermediates for 7 - desacetylamino-11,12-dihydro-colchiceine.

These and other objects and advantages of the invention will become obvious from the following detailed description.

The novel process of the invention for the preparation of 7 - desacetylamino - 11,12 - dihydro - colchiceine comprises oxidizing 2,3,4 - trimethoxy - 5 - (2' - carboxyethyl)- 8,9-dihydro-7-H-benzocycloheptene to hydroxylate the double bond thereby forming the 5-lactone of 2,3,4-trimethoxy - 5,6 - dihydroxy - 5 - (2' - carboxyethyl) - 5,6,8, 9-tetrahydro-7-H-benzocycloheptene, reacting the latter with a strong mineral acid to form 2,3,4-trimethoxy-5-(2'-carboxyethyl) - 6 - oxo - 5,6,8,9 - tetrahydro - 7 - H-benzocycloheptene, reacting the latter with an alkali metal acetylide to form 2,3,4-trimethoxy-5-(2'-carboxyethyl)-6-hydroxy - 6 - ethynyl - 5,6,8,9 - tetrahydro - 7 - H - benzocycloheptene, catalytically hydrogenating the latter to form 2,3,4 - trimethoxy - 5 - (2' - carboxyethyl) - 6 -hydroxy - 6 - vinyl - 5,6,8,9 - tetrahydro - 7 - H - benzocycloheptene, reacting the latter with a lower alkyl esterifying agent to form the lower alkyl ester of 2,3,4-trimethoxy-5- (2' - carboxyethyl) - 6 - hydroxy - 6 -vinyl - 5,6,8,9 - tetrahydro-7-H-benzocycloheptene, brominating the latter to form 2,3,4 - trimethoxy - 5 - (2' - carboalkoxyethyl)-6- (2' - bromoethylidene) - 5,6,8,9 - tetrahydro - 7 - H-benzocycloheptene, reacting the latter with a cyanurating agent to form 2,3,4-trimethoxy-5-(2'-carboalkoxyethyl)- 6 - (2' - cyanoethylidene) - 5,6,8,9 - tetrahydro - 7 - H-benzocycloheptene, reacting the latter with a sulfonic acid under anhydrous conditions to form 2,3,4-trimethoxy-5- (2' - carboalkoxyethyl) - 6 - (2' - cyanoethyl) - 8,9 - dihydro-7-H-benzocycloheptene, heating the latter in the presence of a heptagonal cyclizing alkaline agent to form 1,2,3 trimethoxy - 9 - cyano - 10 - hydroxy - 5,6,7,8,11,12-hexahydrobenzo-(a)-heptalene, reacting the latter with an acylating derivative of an organic carboxylic acid to form 1,2,3 - trimethoxy - 9 - cyano - 10 - acyloxy - 5,6,7,8,11, 12-hexahydrobenzo-(a)-heptalene, saponifying the latter to form 1,2,3 - trimethoxy - 9 - cyano - 10 - oxo - 5,67,8, 9,10,11,12-octahydrobenzo-(a)-heptalene, reacting the latter with a compound selected from the group consisting of alkali metals, alkali metal hydrides and amidides to form the alkali metal derivative thereof, reacting the latter with an acyl peroxide to form the corresponding 1,2,3 - trimethoxy - 9 - cyano - 9 - acyloxy - 10 - oxo - 5,6, 7,8,9,10,11,12-octahydrobenzo-(a)-heptalene and reacting the latter with a weak alkaline agent to form 7-desacetylamino-11,12-dihydro-colchiceine.

The hydroxylation of the double bond 2,3,4-trimethoxy-5 - (2' - carboxyethyl) - 8,9 - dihydro - 7 - H - benzocycloheptene by oxidation may be effected with an organic peracid such as perbenzoic acid, perphthalic acid, peracetic acid, etc. or with inorganic oxidizing agents such as potassium permanganate, osmium tetraoxide, etc.

The reaction of the 5-lactone of 2,3,4-trimethoxy-5,6-dihydroxy - 5 - (2' - carboxyethyl) - 5,6,8,9 - tetrahydro-7-H-benzocycloheptene with a strong mineral acid effects a pinacolic rearrangement of the lactone group causing an opening of the said group. Examples of suitable strong mineral acids are sulfuric acid in acetic acid, hydrochloric acid, polyphosphoric acids, etc.

The ethynylation of 2,3,4-trimethoxy-5-(2'-carboxyethyl) - 6 - oxo - 5,6,8,9 - tetrahydro - 7 - H - benzocycloheptene may be effected with an alkali metal acetylide such as potassium acetylide or sodium acetylide and the catalytic hydrogenation of the resulting 6-ethynyl group may be effected in the presence of a palladium catalyst.

The bromination of 2,3,4-trimethoxy-5-(2'-carboalkoxyethyl) - 6 - hydroxy - 6 - vinyl - 5,6,8,9 - tetrahydro-7-H-benzocycloheptene which effects an allylic rearrangement may be effected with a brominating agent such as phosphorus tribromide or thionyl bromide. The bromo compound can then be reacted with a cyanurating agent such as cuprous cyanide in the presence of an aprotic dipolar solvent such as dimethylformamide, sulfolane, N-methyl-pyrrolidone and preferably dimethylsulfoxide.

In order to cause migration of the exocyclic double bond of 2,3,4 - trimethoxy - 5 - (2' - carboalkoxyethyl)- 6 - (2' - cyanoethylidene) - 5,6,8,9 - tetrahydro - 7 -H-benzocycloheptene into the 5,6-position, a strong sulfonic acid such as 2,4-dinitrobenzene sulfonic acid, p-toluene sulfonic acid, etc. is preferred.

The heptagonal cyclizing alkaline agent for the cyclization of a 2,3,4-trimethoxy-5-(2'-carboalkoxyethyl)-6-(2'-cyanoethyl-8,9-dihydro-7-H-benzocycloheptene may be an alkali metal such as potassium or a hydride of an alkali metal such as sodium hydride while operating in a hydrocarbonated solvent.

The acyl radical of 1,2,3 - trimethoxy - 9-cyano-10-acyloxy - 5,6,7,8,11,12 - hexahydrobenzo-(a)-heptalene which is formed by reaction with an acylating derivative such as the acid chloride or anhydride in the presence of a tertiary amine such as pyridine may be derived from an organic carboxylic acid having 1 to 18 carbon atoms. Examples of suitable acids are alkanoic acids such as acetic acid, butyric acid, caproic acid, etc., alkenoic acids; aromatic acids such as benzoic acids, etc. The saponification of the said ester may be effected with alkaline agents such as potassium hydroxide, sodium hydroxide, etc.

The acyloxylation of the alkali metal derivative of 1,2,3-trimethoxy - 9 - cyano - 10-oxo-5,6,7,8,9,10,11,12-octahydrobenzo-(a)-heptalene is effected with an acyl peroxide such as benzoyl peroxide or p-nitrobenzoyl peroxide in an inert organic solvent such as benzene. The transformation of 1,2,3-trimethoxy - 9 - cyano-9-acyloxy-10 - oxo - 5,6,7,8,9,10,11,12-octahydrobenzo-(a)-heptalene to 7-desacetylamino-11,12-dihydro-colchiceine is effected with a weak alkaline agent such as sodium bicarbonate in an aqueous lower alkanol such as ethanol. The reaction scheme is illustrated in Table I.

TABLE I

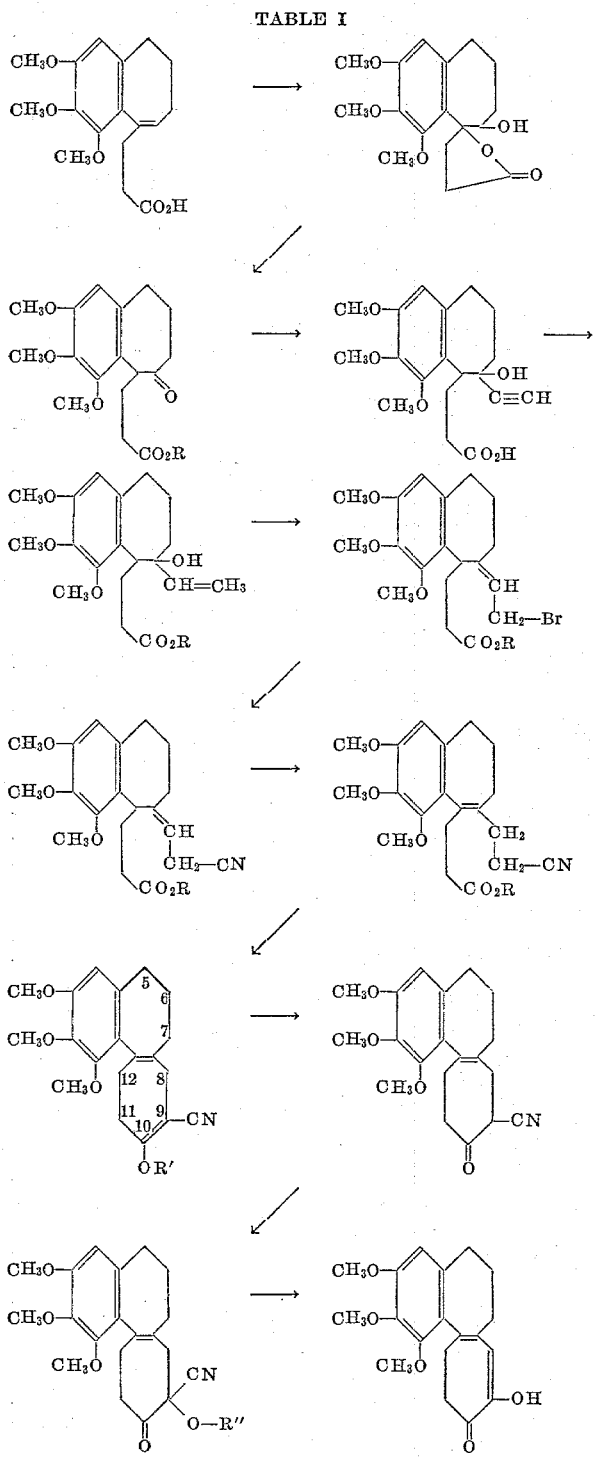

wherein R is hydrogen or a lower alkyl radical, R' is hydrogen or an acyl radical of an organic carboxylic acid having 1 to 18 carbon atoms and R" is an acyl radical of an organic carboxylic acid having 1 to 18 carbon atoms.

The novel process of the invention differs from known synthesis of colchicinic compounds in that the heptagonal rings B and C are formed directly without the laborious operation needed to widen a six carbon ring which causes a substantial loss of yield. Moreover, 7-desacetylamino-11,12-dihydro-colchiceine can be isolated in a stable crystalline form if prepared in a slightly basic medium and protected from aerial oxidation whereas the prior art [Van Tamelen et al, Tetrahedron, 1961, vol. 14, p. 31] obtained only unstable solutions of the product or an uncrystallized product.

The new process also has the adavntage of introducing two functions in the 9- and 10-positions which are easily transformable into the C ring as well as a double bond between the carbon atoms which are common to the B and C cycles giving access to the tropolonic C ring. The presence of this double bond confers on the process of the invention a polyvalent character because the intermediate products obtained can serve equally well in the formation of colchicinic derivatives free of the 7-acetylamino group or of colchicinic derivatives having the 7-acetylamino group due to the existence of an active methylene group at this point.

The creation of the double bond between the carbons in the 9- and the 10-position of ring C presents an unexpected characteristic. It is a result of the cyclization of a 2,3,4 - trimethoxy - 5 - (2' - carboalkoxyethyl)-6-(2'-cyano-ethyl)-8,9-dihydro-7-H-benzocycloheptene by heat in the presence of a heptagonal cyclising alkaline agent to obtain a 1,2,3 - trimethoxy - 9-cyano-10-hydroxy-5,6,7,8,11,12-hexahydrobenzo-(a)-heptalene. This reaction, difficult to foresee, constitutes the first cyclization effected by a condensation between an ester function and a methylene in the α-position of a nitrile. Also, it is unexpectedly possible to saponify the enolic esters of 1,2,3-trimethoxy-9 - cyano - 10 - hydroxy-5,6,7,8,11,12-hexahydrobenzo-(a)-heptalene by the action of a strong alkali without provoking the opening of the C ring nor hydrolysis of the nitrile group.

Another advantage of the novel process is that the presence of the active methine group between the carbonyl and nitrile groups of 1,2,3-trimethoxy-9-cyano-10-oxo-5,6,7,8,9,10,11,12-octahydrobenzo-(a)-heptalene permits acyloxylation of the said compound into a cyanohydrin ester (1,2,3-trimethoxy-9-cyano-9-acyloxy-10-oxo-5,6,7,8,9,10,11,12 - octahydrobenzo-(a)-heptalene). Due to the labile configuration of the said cyanohydrin ester, it can be easily transformed into 7-desacetylamino-11,12-dihydro-colchiceine by the action of a weak alkaline agent.

An α-diketo structure, i.e. the compound I, is thus obtained from a β-cyano ketone, whereas the pertinent literature hitherto did not know anything else than the transformation of α-keto esters into α-keto alcohols, which besides need to be oxidized, if it is wanted to obtain a diketo structure (see f.i. S. O. Lawesson and S. Gronwall, Acta Chem. Scand. (1960) 14, p. 1445).

In the following example there are described several preferred embodiments to illustrate the invention. However, it should be understood that the invention is not intended to be limited to the specific embodiments. The colchicic synthesis, an object of the present invention, can be effected starting from compounds having other ethers on the aromatic ring A instead of the trimethyl ether.

EXAMPLE—PREPARATION OF 7-DESACETYL-AMINO-11,12-DIHYDRO-COLCHICEINE

Step A.—Preparation of the 5-lactone of 2,3,4-trimethoxy-5,6-dihydroxy-5-(2'-carboxyethyl) - 5,6,8,9 - tetrahydro-7-H-benzocycloheptene 25.6 gm. of 2,3,4-trimethoxy-5-(2'-carboxyethyl)-8,9-dihydro-7-H-benzocycloheptene (described by Acker, "An Approach to the Synthesis of Colchicine," Columbia University, 1960) were dissolved while cooling to 0° C. in a 100 cc. of ether and then 83 cc. of a 37% perphthalic acid solution were added while agitating. The reaction mixture was allowed to stand overnight in a refrigerator and then the ether was removed. Methylene chloride was added to the reaction mixture and a solution of sodium bicarbonate until total dissolution occurred. The organic phase was decanted and the aqueous phase was re-extracted with methylene chloride. The organic phases were combined, washed with sodium bicarbonate, then with water, dried and distilled to dryness. The residue was crystallized from ether to obtain 17.713 gm. of the 5-lactone of 2,3,4 - trimethoxy - 5,6-dihydroxy-5-(2'-carboxyethyl)-5,6,8,9-tetrahydro - 7 - H - benzocycloheptene having a melting point of 206° C.

The product occurred in the form of white crystals insoluble in water, dilute cold aqueous acids and alkalis, slightly soluble in ether, acetone, benzene and soluble in alcohols and chloroform.

Analysis.—$C_{17}H_{22}O_6$; molecular weight=322.35. Calculated: C, 63.34%; H, 6.88%; O, 29.78%. Found: C, 63.6%; H, 6.8%; O, 29.0%.

This product is not described in the literature.

Step B.—Preparation of 2,3,4-trimethoxy-5-(2'-carboxyethyl)-6-oxo-5,6,8,9-tetrahydro-7-H-benzocycloheptene 20 gm. of the 5-lactone of 2,3,4-trimethoxy-5,6-dihydroxy-5-(2'-carboxyethyl) - 5,6,8,9 - tetrahydro - 7 - H - benzocycloheptene were dissolved in 100 cc. of acetic acid and 100 cc. of 5 N sulfuric acid while agitating at about 75° C. The reaction mixture was heated for one hour at 80° C. and then some iced water was added thereto. The diluted solution was extracted with methylene chloride and the organic phase was separated. An aqueous solution of sodium bicarbonate was added to the organic phase to neutralize it. The aqueous phase was separated, acidified with 2 N hydrochloric acid and extracted with methylene chloride. The organic phase was washed once with water until the wash waters were neutral, dried over magnesium sulfate and distilled to dryness to obtain 21 gm. of product which upon crystallization from isopropyl ether gave 17.7 gm. of 2,3,4-trimethoxy-5-(2'-carboxyethyl)-6-oxo-5,6,8,9 - tetrahydro-7-H-benzocycloheptene having a melting point of 92° C.

The product occurred in the form of white crystals insoluble in water and dilute aqueous acids and soluble in dilute aqueous alkalis, alcohols, ether, acetone, benzene and chloroform.

This product is not described in the literature.

Analysis.—$C_{17}H_{22}O_6$; molecular weight=322.35. Calculated: C, 63.34%; H, 6.88%. Found: C, 63.2%; H, 6.9%.

Step B (1).—Preparation of 2,3,4-trimethoxy-5-(2'-carbomethoxyethyl)-6-oxo-5,6,8,9-tetrahydro-7-H - benzocycloheptene 10 gm. of 2,3,4-trimethoxy-5-(2'-carboxyethyl)-6-oxo-5,6,8,9-tetrahydro-7-H-benzocycloheptene were dissolved in 500 cc. of methylene chloride and the reaction mixture was cooled in an ice bath. 100 cc. or an excess of diazomethane in solution in methylene chloride were added and the reaction mixture was allowed to stand for ¼ hour at about 0° C. and then was poured on alumina. Then, the reaction mixture was vacuum filtered and the alumina was washed with methylene chloride. The filtrates were combined and distilled to dryness and the product was crystallized from isopropyl ether to obtain 9.85 gm. of 2,3,4-trimethoxy-5-(2'-carbomethoxyethyl)-6-oxo-5,6,8,9-tetrahydro-7 - H - benzocycloheptene having a melting point of 86° C.

The product occurred in the form of long white prisms insoluble in water, dilute aqueous acids and alkalis and soluble in alcohols, ether, acetone, benzene and chloroform.

Analysis.—$C_{18}H_{24}O_6$; molecular weight=336.37. Calculated: C, 64.27%; H, 7.19%. Found: C, 64.5%; H, 7.2%.

This product is not described in the literature.

Step C.—Preparation of 2,3,4-trimethoxy-5-(2'-carboxyethyl)-6-hydroxy-6-ethynyl - 5,6,8,9 - tetrahydro-7-H-benzocycloheptene A current of purified acetylene was made to bubble for a period of several minutes into 1.2 liters of liquid ammonia and the reaction mixture was cooled by an acetone-carbon dioxide bath. Then, 5.13 gm. of sodium were introduced in small portions and the bubbling of acetylene was continued for a period of 2 and ½ hours. Then, a solution of 12 gm. of 2,3,4-trimethoxy-5-(2'-carboxyethyl) - 6 - oxo - 5,6,8,9 - tetrahydro-7-H-benzocycloheptene dissolved in 60 cc. of anhydrous tetrahydrofuran was added dropwise thereto and the bubbling of acetylene therethrough was continued for a period of a further 5 and ½ hours while cooling the reaction mixture to a temperature of about —40° C. Then, the ammonia was evaporated and after 50 cc. of diluted acetic acid were added thereto together with some ice, the reaction mixture was extracted with methylene chloride. The extracts were washed with water, dried and distilled to dryness under vacuum to obtain 14 gm. of a product which upon recrystallization from ether yielded 7.577 gm. of 2,3,4-trimethoxy - 5 - (2' - carboxyethyl) - 6 - hydroxy-6-ethynyl - 5,6,8,9 - tetrahydro-7-H-benzocycloheptene. The product was utilizable as such for the next step of the synthesis.

For analysis, this product was recrystallized from a mixture of chloroform and ether whereby it occurred in the form of white crystals which melted at 150° C. The product was insoluble in water and dilute aqueous acids, slightly soluble in ether and soluble in alcohols, acetone, chloroform and dilute aqueous alkalis.

Analysis.—$C_{19}H_{24}O_6$; molecular weight=348.38. Calculated: C, 65.50%; H, 6.94%. Found: C, 65.50%; H, 6.9%.

This product is not described in the literature.

Step D.—Preparation of 2,3,4-trimethoxy-5-(2'-carboxyethyl)-6-hydroxy - 6 - vinyl - 5,6,8,9 - tetrahydro-7-H-benzocycloheptene 8.266 gm. of 2,3,4-trimethoxy-5-(2'-carboxyethyl)-6-hydroxy-6-ethynyl - 5,6,8,9, - tetrahydro-7-H-benzocycloheptene were dissolved in 82 cc. of dimethylformamide containing 10% of pyridine. 826 mg. of calcium carbonate containing 5% of palladium were added and the reaction mixture was hydrogenated at room temperature under normal pressure until 570 cc. of gas were absorbed. Thereafter, the reaction mixture was vacuum filtered and the filter cake was rinsed with methylene chloride. The filtrates were combined and diluted with water. The aqueous filtrate was extracted with methylene chloride and the extract was washed with 2 N hydrochloric acid and with water, dried and distilled to dryness to obtain 9 gm. of 2,3,4-trimethoxy-5-(2'-carboxyethyl)-6-hydroxy-6 - vinyl-5,6,8,9-tetrahydro-7-H-benzocycloheptene having a melting point of 142° C. which product was crystallized from a mixture of ether and isopropyl ether.

The product was white and insoluble in water, dilute aqueous acids, slightly soluble in ether and soluble in alcohols, acetone, benzene, chloroform and dilute aqueous alkalis.

This product is not described in the literature.

Step E.—Preparation of 2,3,4-trimethoxy - 5 - (2'-carbomethoxyethyl)-6-hydroxy-6-vinyl - 5,6,8,9 - tetrahydro-7-H-benzocycloheptene 6.326 gm. of 2,3,4-trimethoxy-5-(2'-carboxyethyl)-6-hydroxy-6-vinyl - 5,6,8,9 - tetrahydro - 7 - H - benzocycloheptene were dissolved in 50 cc. of methylene chloride and the reaction mixture was cooled to about 5° C. 60 cc. or an excess of diazomethane in solution in methylene chloride were added and after the reaction mixture stood for a period of 10 minutes, it was filtered through alumina and the filtrate was distilled to dryness to obtain 6.09 gm. of 2,3,4-trimethoxy-5-(2'-carbomethoxyethyl)-6-hydroxy-vinyl - 5,6,8,9 - tetrahydro-7-H-benzocycloheptene which was crystallized from hexane.

For analysis, a sample of the product was recrystallized from isopropyl ether. The product occurred in the form of white prisms melting at 58° C. and it was insoluble in water, dilute aqueous acids and alkalis and soluble in alcohols, ether, acetone, benzene and chloroform.

*Analysis.*—$C_{20}H_{28}O_6$; molecular weight=364.42. Calculated: C, 65.91%; H, 7.74%. Found: C, 66.11%; H, 7.8%.

This product is not described in the literature.

*Step F.—Preparation of 2,3,4-trimethoxy - 5 - (2'-carbomethoxyethyl)-6-(2'bromoethylidene) - 5,6,8,9 - tetrahydro-7-H-benzocycloheptene*

4.368 gm. of 2,3,4-trimethoxy - 5 - (2'-carbomethoxyethyl)-6-hydroxy-6-vinyl - 5,6,8,9 - tetrahydro-7-H-benzocycloheptene were dissolved in 10 cc. of of chloroform and 24 cc. of petroleum ether (boiling range 60° to 80° C.) and the reaction mixture was cooled to —30° C. 12.2 cc. of a solution of 1 cc. of phosphorus tribromide in 9 cc. of petroleum ether (boiling range 60° to 80° C.) were added over a space of one hour and the reaction mixture was maintained under agitation for 5 hours at a temperature of about —15° C. Thereafter the reaction mixture was poured into iced water and extracted with ether. The extract was washed several times with water until the wash water was neutral. Thereafter the extract was dried and evaporated to dryness under vacuum to obtain 5.3 gm. of an oil which crystallized from petroleum ether (boiling range 60° to 80° C.) to give 3.8 gm. of 2,3,4-trimethoxy - 5 - (2'-carbomethoxyethyl) - 6 - (2'-bromoethylidene) - 5,6,8,9 - tetrahydro-7-H-benzocycloheptene.

After recrystallization from a mixture of ether and hexane, a product was obtained which occurred in the form of white crystals which melted at 80° C. and was insoluble in water, dilute aqueous acids and alkalis and soluble in alcohols, ether, acetone, benzene and chloroform.

*Analysis.* — $C_{20}H_{27}O_5Br$; molecular weight=427.34. Calculated: C, 56.21%; H, 6.37%; Br, 18.70. Found: C, 56.2%; H, 6.2%; Br, 18.6–18.8%.

This compound is not described in the literature.

*Step G.—Preparation of 2,3,4-trimethoxy - 5-(2'-carbomethoxyethyl) - 6-(2'-cyanoethylidene) - 5,6,8,9-tetrahydro-7-H-benzocycloheptene*

3 gm. of copper cyanide were introduced into 80 cc. of dimethylsulfoxide and after the reaction mixture stood for a quarter of an hour, 3 gm. of 2,3,4-trimethoxy-5-(2'-carbomethoxyethyl) - 6-(2'-bromoethylidene)-5,6,8,9-tetrahydro-7-H-benzocycloheptene were added. The reaction mixture was agitated for a period of 25 hours at 50° C. and under an atmosphere of nitrogen and then, the reaction mixture was cooled. Two volumes of methylene chloride were added and the organic phase was washed with 2 N hydrochloric acid solution, then with water, dried and the solvent was distilled. The residue was crystallized from a mixture of isopropyl ether and petroleum ether (fraction having a boiling range of 60° to 80° C.) to obtain 1.55 gm. of a product which was purified by subjecting it to chromatography though magnesium silicate with elution with benzene and methylene chloride. 1.052 gm. of 2,3,4-trimethoxy-5-(2'-carbomethoxyethyl) - 6-(2'-cyanoethylidene) - 5,6,8,9-tetrahydro-7-H-benzocycloheptene were obtained.

After recrystallization from isopropyl ether, the product occurred in the form of white crystals melting at 93° C. and it was insoluble in water and dilute aqueous acids and alkalis and soluble in alcohols, ether, acetone, benzene and chlorform.

*Analysis.*—$C_{21}H_{27}O_5N$; molecular weight=373.43. Calculated: C, 67.54%; H, 7.29%; N, 3.75%. Found: C, 67.8%; H, 7.2%; N, 3.8%.

This compound is not described in the literature.

*Step H.—Preparation of 2,3,4-trimethoxy - 5-(2'-carbomethoxyethyl) - 6-(2' - cyanoethyl)-8,9-dihydro-7-H-benzocycloheptene*

1.2 gm. of hydrated 2,4-dinitrobenzene sulfonic acid were dissolved in 200 cc. of anhydrous benzene by heating the mixture at reflux for two hours and by absorbing the distillate water on anhydrous calcium sulfate whereby an anhydrous solution was obtained. Then, 2.5 gm. of 2,3,4-trimethoxy - 5-(2'carbomethoxyethyl) -6- (2'cyanoethylidene)-5,6,8,9 - tetrahydro - 7-H-benzocycloheptene were introduced and the heating at reflux was continued for a period of two hours. Then the reaction mixture was cooled, washed with water, with sodium bicarbonate solution and again with water. The wash waters were re-extracted with ether and the organic phases were combined, dried and distilled to dryness under vacuum. The product was crystallized from ispropyl ether to obtain about 1 gm. of 2,3,4-trimethoxy-5 - (2'-carbomethoxyethyl)-6-(2'-cyanoethyl) - 8,9-dihydro - 7-H-benzocycloheptene having a melting point of 70° C.

The product occurred in the form of white prisms insoluble in water and dilute aqueous acids and alkalis and soluble in alcohols, ether, acetone, benzene and chloroform.

*Analysis.*—$C_{21}H_{27}O_5N$; molecular weight=373.43. Calculated: C, 67.54%; H, 7.29%; N. 3.75%. Found: C, 67.5%; H, 7.5%; N, 4.0%.

This product is not described in the literature.

*Step I.—Preparation of 1,2,3 - trimethoxy-9-cyano-10-benzoyloxy - 5,6,7,8,11,12 - hexahydrobenzo - (a)-heptalene*

(1) *Cyclization.*—105 mg. of potassium were introduced into 25 cc. of toluene under an atmosphere of nitrogen and the reaction mixture was agitated and heated to reflux. Slowly 500 mg. of 2,3,4-trimethoxy-5-(2'-carbomethoxyethyl)-6-(2'-cyanoethyl) - 8,9-dihydro-7-H-benzocycloheptene dissolved in 25 cc. of anhydrous toluene were added and the heating was continued for a period of two hours under agitation. Then, the reaction mixture was cooled and 2 cc. of anhydrous methanol were cautiously added. The reaction mixture was diluted with iced water and extracted with ether and the extract was washed with water until the wash waters were neutral. The aqueous alkaline phases were combined, acidified with 2 N hydrochloric acid and extracted with methylene chloride. The extract was washed with water, dried and distilled to dryness under vacuum to obtain 420 mg. of 1,2,3-trimethoxy-9-cyano-10-hydroxy-5,6,7,8,11,12-hexahydrobenzo-(a)-heptalene.

(2) *Benzoylation.*—The 420 mg. of the said cyclized product were dissolved in 4 cc. of anhydrous pyridine and the reaction mixture was cooled slightly. 182 mg. of benzoyl chloride were added and the reaction mixture was agitated for a period of two hours at room temperature. Next some iced water was added and the reaction mixture was extracted with methylene chloride. The extract was washed with 2 N hydrochloric acid solution, with a solution of sodium bicarbonate and with water, dried and evaporated to dryness in order to obtain 440 mg. of a raw product. By subjecting the product to successive chromatography through silica gel with elution with methylene chloride containing 10% of methanol and of alumina with elution with benzene, 160 mg. of 1,2,3-trimethoxy-9-cyano-10 - benzoyloxy - 5,6,7,8,11,12-hexahydrobenzo-(a)-heptalene were obtained which upon recrystallization from isopropyl ether had a melting point of 130° C.

The said product was recrystallized from a mixture of acetone and isopropyl ether to obtain a product which occurred in the form of white needles and was insoluble in water and dilute aqueous acids and alkalis and soluble in alcohols, ether, acetone, benzene and chloroform.

*Analysis.*—$C_{27}H_{27}O_5N$; molecular weight=445.59. Calculated: C, 72.79%; H, 6.11%; N, 3.14%. Found: C, 73.0%; H, 6.2%; N, 3.4%.

This compound is not described in the literature.

*Step J.—Preparation of 1,2,3-trimethoxy-9-cyano-10-oxo-5,6,7,8,9,10,11,12-octahydrobenzo-(a)-heptalene*

800 mg. of 1,2,3-trimethoxy-9-cyano-10-benzoyloxy-5,6,7,8,11,12 - hexahydrobenzo-(a)-heptalene were dissolved in 20 cc. of methanol at reflux and after the reaction mixture was cooled to room temperature, an aqueous solution of methanolic potassium hydroxide prepared from 116 mg. of potassium hydroxide in 1 cc. of water added to 11 cc. of methanol, was introduced. The reaction mixture was allowed to stand at rest for a period of 16 hours and the methanol was removed under vacuum. The reaction mixture was diluted with water and extracted with methylene chloride. The extract was washed with a saturated salt solution, dried and distilled to dryness. The methyl benzoate present was removed by a current of nitrogen and after recrystallization from isopropyl ether, 556 mg. of 1,2,3-trimethoxy-9-cyano-10-oxo-5,6,7,8,9,10,11,12-octahydrobenzo-(a)-heptalene having a melting point of 104° C. were obtained.

The product occurred in the form of colorless crystals insoluble in water and dilute aqueous acids, slightly soluble in ether, and soluble in alcohol, acetone, benzene, chloroform and dilute aqueous alkalis.

*Microanalysis.*—$C_{20}H_{23}O_4N$; molecular weight=341.38. Calculated: C, 70.36%; H, 6.79%; N, 4.10%. Found: C, 70.20%; H, 6.80%; N, 4.10%.

This compound is not described in the literature.

*Step K.*—*Preparation of 1,2,3-trimethoxy-9-cyano-9-benzoyl-oxy-10-oxo-5,6,7,8,9,10,11,12-octahydrobenzo-(a)-heptalene*

150 mg. of 1,2,3-trimethoxy-9-cyano-10-oxo-5,6,7,8,9,10,11,12-octahydrobenzo-(a)-heptalene were dissolved in 5 cc. of anhydrous benzene. Under an atmosphere of nitrogen a large excess of sodium in large freshly cut shavings was introduced and the reaction mixture was heated for a period of 15 hours at reflux. Always under nitrogen, the excess shavings of sodium were eliminated and the suspension of the enolate was cooled to +5° C. 105 mg. of benzoyl peroxide were added and the reaction mixture was allowed to stand overnight at room temperature under agitation. Thereafter the reaction mixture was poured into iced water containing an excess of 2 N hydrochloric acid and the acidified solution was extracted with ether. The extract was washed with water, with sodium bicarbonate solution, then again with water, dried and the solvents were removed on the water bath. After recrystallization from ether, isopropyl ether and alcohol, 0.154 gm. of 1,2,3-trimethoxy-9-cyano-9-benzoyloxy-10-oxo-5,6,7,8,9,10,11,12-octahydrobenzo-(a)-heptalene having a melting point of 142° C. were obtained.

The product occurred in the form of prisms insoluble in water and dilute aqueous acids, slightly soluble in alcohol and soluble in ether, acetone, benzene and chloroform.

*Microanalysis.* — $C_{27}H_{27}O_6N$; molecular weight =461.49. Calculated: C, 70.27%; H, 5.90%; N, 3.04%. Found: C, 70.40%; H, 5.90%; N, 3.10%.

This compound is not described in the literature.

*Step L.*—*Preparation of 7-desacetylamino-11,12-dihydro-colchiceine*

327 mg. of 1,2,3-trimethoxy-9-cyano-9-benzoyloxy-10-oxo-5,6,7,8,9,10,11,12-octahydrobenzo-(a)-heptalene were introduced into 1 cc. of an aqueous solution saturated with sodium bicarbonate, 2.5 cc. of water and 2.5 cc. of ethanol and the mixture was heated to reflux for a period of 10 minutes under an atmosphere of nitrogen. Immediately afterwards, iced water was added thereto and the solution was extracted with ether. The extract was washed with water and dried and the ether was removed. The residue was taken up by one drop of ether and crystallization commenced. The crystals were transferred onto a filter, washed with isopropyl ether and dried to obtain 0.161 gm. of 7-desacetylamino-11,12-dihydro-colchiceine having a melting point of 135–137° C.

The product occurred in the form of yellow prisms insoluble in water and dilute aqueous acids and soluble in alcohol, ether, acetone, benzene and chloroform.

*Microanalysis.*—$C_{19}H_{22}O_5$; molecular weight=330.37. Calculated: C, 69.07%; H, 6.71%. Found: C, 69.30%; H, 7.0%.

Various modifications of the process may be made without departing from the spirit or scope thereof and it is to be understood that the invention is to be limited only as defined in the appended claims.

We claim:

1. A process for the preparation of 7-desacetylamino-11,12 - dihydro - colchiceine which comprises oxidizing 2,3,4-trimethoxy - 5 - (2'-carboxyethyl)-8,9-dihydro-7-H-benzocycloheptene to hydroxylate the double bond thereby forming the 5-lactone of 2,3,4-trimethoxy-5,6-dihydroxy-5-(2'-carboxyethyl) ‑ 5,6,8,9 ‑ tetrahydro-7-H-benzocycloheptene, reacting the latter with a strong mineral acid to form 2,3,4-trimethoxy-5-(2'-carboxyethyl)-6-oxo-5,6,8,9 ‑ tetrahydro-7-H-benzocycloheptene, reacting the latter with an alkali metal acetylide to form 2,3,4-trimethoxy-5-(2'-carboxyethyl)-6-hydroxy ‑ 6 ‑ ethynyl-5,6,8,9-tetrahydro-7-H-benzocycloheptene, catalytically hydrogenating the latter to form 2,3,4-trimethoxy-5-(2'-carboxyethyl)-6-hydroxy ‑ 6 ‑ vinyl-5,6,8,9-tetrahydro-7-H-benzocycloheptene, reacting the latter with a lower alkyl esterifying agent to form the lower alkyl ester of 2,3,4-trimethoxy-5-(2'-carboxyethyl) ‑ 6 ‑ hydroxy ‑ 6 ‑ vinyl-5,6,8,9-tetrahydro-7-H-benzocycloheptene, brominating the latter to form 2,3,4-trimethoxy-5-(2'-carboalkoxyethyl)-6-(2'-bromoethylidene)-5,6,8,9 ‑ tetrahydro-7-H-benzocycloheptene, reacting the latter with a cyanurating agent to form 2,3,4-trimethoxy ‑ 5 ‑ (2'-carboalkoxyethyl)-6-(2'-cyanoethylidene) ‑ 5,6,8,9 ‑ tetrahydro-7-H-benzocycloheptene, reacting the latter with a sulfonic acid under anhydrous conditions to form 2,3,4-trimethoxy-5-(2'-carboalkoxyethyl)-6-(2'-cyanoethyl) ‑ 8,9 ‑ dihydro-7-H-benzocycloheptene, heating the latter in the presence of a heptagonal cyclizing alkaline agent to form 1,2,3-trimethoxy-9-cyano-10-hydroxy-5,6,7,8,11,12 - hexahydrobenzo ‑ (a) ‑ heptalene, reacting the latter with an acylating agent of an organic carboxylic acid to form 1,2,3-trimethoxy-9-cyano-10-acyloxy-5,6,7,8,11,12 - hexahydrobenzo-(a)-heptalene, saponifying the latter to form 1,2,3-trimethoxy-9-cyano-10-oxo-5,6,7,8,9,10,11,12 ‑ octahydrobenzo-(a)-heptalene, reacting the latter with a compound selected from the group consisting of alkali metals, alkali metal hydrides and amidides to form the alkali metal derivative thereof, reacting the latter with an acyl peroxide to form the corresponding 1,2,3-trimethoxy ‑ 9 ‑ cyano-9-acyloxy-10-oxo-5,6,7,8,9,10,11,12-octahydrobenzo-(a)-heptalene and reacting the latter with a weak alkaline agent to form 7-desacetylamino-11,12-dihydro-colchiceine.

2. A process for the preparation of 1,2,3-trimethoxy-9-cyano ‑ 10 ‑ hydroxy ‑ 5,6,7,8,11,12-hexahydrobenzo-(a)-heptalene which comprises oxidizing 2,3,4-trimethoxy-5-(2'-carboxyethyl)-8,9-dihydro-7 ‑ H ‑ benzocycloheptene to hydroxylate the double bond thereby forming the 5-lactone of 2,3,4-trimethoxy-5,6-dihydroxy-5-(2'-carboxyethyl)-5,6,8,9-tetrahydro-7-H ‑ benzo-cycloheptene, reacting the latter with a strong mineral acid to form 2,3,4-trimethoxy ‑ 5-(2'-carboxyethyl)-6-oxo-5,6,8,9-tetrahydro-7-H-benzocycloheptene, reacting the latter with an alkali metal acetylide to form 2,3,4-trimethoxy-5-(2'-carboxyethyl)-6-hydroxy-6-ethynyl-5,6,8,9-tetrahydro-7-H-benzocycloheptene, catalytically hydrogenating the latter to form 2,3,4 ‑ trimethoxy-5-(2'-carboxyethyl)-6-hydroxy-6-vinyl-5,6,8,9-tetrahydro-7-H ‑ benzocycloheptene, reacting the latter with a lower alkyl esterifying agent to form the lower alkyl ester of 2,3,4-trimethoxy-5-(2'-carboxyethyl)-6 ‑ hydroxy-6-vinyl-5,6,8,9-tetrahydro-7-H-benzocycloheptene, brominating the latter to form 2,3,4-trimethoxy-5-(2'-carboalkoxyethyl)-6 ‑ (2'-bromoethylidene) ‑ 5,6,8,9-tetrahydro-7-H-benzocycloheptene, reacting the latter with a cyanurating agent to form 2,3,4-trimethoxy-5-(2'-carboalkoxyethyl) ‑ 6-(2'-cyanoethylidene)-5,6,8,9-tetrahydro-77-H-benzocycloheptene, reacting the latter with a sulfonic acid under anhydrous conditions to form 2,3,4-trimethoxy-5-(2′-carboalkoxyethyl)-6-(2′-cyanoethyl) - 8,9-dihydro-7-H-benzocycloheptene, heating the latter in the presence of a heptagonal cyclizing alkaline agent to form 1,2,3 - trimethoxy - 9 - cyano - 10 - hydroxy-5,6,7,8,12,12-hexahydrobenzo-(a)-heptalene.

3. The process of claim 1 wherein the hydroxylation of the double bond is effected with an oxidizing agent selected from the group consisting of organic peracids, potassium permanganate and osmium tetraoxide.

4. The process of claim 1 wherein the cyanuration is effected with cuprous cyanide in dimethylsulfoxide.

5. The process of claim 1 wherein the alkali metal derivative of 1,2,3 - trimethoxy-9-cyano-10-oxo-5,6,7,8,9,10,11,12-octahydrobenzo-(a)-heptalene is reacted with benzoyl peroxide.

6. A compound selected from the group consisting of 1,2,3 - trimethoxy - 9 - cyano-10-hydroxy-5,6,7,8,11,12-hexahydrobenzo-(a)-heptalene and its carboxylic acid esters wherein the said acid has 1 to 18 carbon atoms.

7. 1,2,3-trimethoxy - 9 - cyano - 10-hydroxy-5,6,7,8,11,12-hexahydrobenzo-(a)-heptalene.

8. 1,2,3 - trimethoxy - 9 - cyano - 10-benzoyloxy-5,6,7,8,11,12-hexahydrobenzo-(a)-heptalene.

9. The 5-lactone of 2,3,4-trimethoxy-5,6-dihydroxy-5-(2′ - carboxyethyl) - 5,6,8,9 - tetrahydro-7-H-benzocycloheptene.

10. A compound selected from the group consisting of 2,3,4 - trimethoxy - 5 - (2′-carboxyethyl)-6-oxo-5,6,8,9-tetrahydro-7-H-benzocycloheptene and its lower alkyl esters.

11. 2,3,4 - trimethoxy - 5 - (2′-carboxyethyl)-6-oxo-5,6,8,9-tetrahydro-7-H-benzocycloheptene.

12. 2,3,4 - trimethoxy - 5 - (2′-carbomethoxyethyl)-6-oxo-5,6,8,9-tetrahydro-7-H-benzocycloheptene.

13. 2,3,4 - trimethoxy - 5-(2′-carboxyethyl)-6-hydroxy-6-ethynyl-5,6,8,9-tetrahydro-7-H-benzocycloheptene.

14. A compound selected from the group consisting of 2,3,4 - trimethoxy - 5 - (2′-carboxyethyl)-6-hydroxy-6-vinyl-5,6,8,9-tetrahydro-7-H - benzocycloheptene and its lower alkyl esters.

15. 2,3,4 - trimethoxy - 5 - (2′ - carboxyethyl) - 6 - hydroxy-6-vinyl-5,6,8,9-tetrahydro-7-H-benzocycloheptene.

16. 2,3,4 - trimethoxy - 5 - (2′-carbomethoxyethyl)-6-vinyl-5,6,8,9-tetrahydro-7-H-benzocycloheptene.

17. A compound selected from the group consisting of 2,3,4 - trimethoxy - 5 - (2′-carboxyethyl)-6-(2′-bromoethylidene)-5,6,8,9-tetrahydro-7 - H - benzocycloheptene and its lower alkyl esters.

18. 2,3,4 - trimethoxy - 5 - (2′-carbomethoxyethyl)-6-(2′ - bromoethylidene) - 5,6,8,9 - tetrahydro - 7 - H-benzocycloheptene.

19. A compound selected from the group consisting of 2,3,4 - trimethoxy - 5 - (2′ - carboxyethyl)-6-(2′-cyanoethylidene) - 5,6,8,9 - tetrahydro-7-H-benzocycloheptene and its lower alkyl esters.

20. 2,3,4 - trimethoxy - 5 - (2′-carbomethoxyethyl)-6-(2′-cyanoethylidene)-5,6,8,9-tetrahydro-7-H - benzocycloheptene.

21. A compound selected from the group consisting of 2,3,4 - trimethoxy - 5 - (2′-carboxyethyl) - 6-(2′-cyanoethyl)-8,9-dihydro-7-H-benzocycloheptene and its lower alkyl esters.

22. 2,3,4 - trimethoxy - 5 - (2′-carbomethoxyethyl)-6-(2′-cyanoethyl)-8,9-dihydro-7-H-benzocycloheptene.

23. 1,2,3 - trimethoxy - 9 - cyano - 10 - oxo - 5,6,7,8,9,10,11,12-octahydrobenzo-(a)-heptalene.

24. 1,2,3 - trimethoxy - 9 - cyano - 9 - acyloxy-10-oxo-5,6,7,8,9,10,11,12 - octahydroenzo-(a)-heptalenes wherein the acyl radical is derived from an organic carboxylic acid having 1 to 18 carbon atoms.

25. 1,2,3 - trimethoxy - 9 - cyano - 9 - benzoyloxy-10-oxo-5,6,7,8,9,10,11,12-octahydrobenzo-(a)-heptalene.

No references cited

ALEX MAZEL, *Primary Examiner.*

JOSEPH A. NARCAVAGE, *Assistant Examiner.*